United States Patent [19]

Minner et al.

[11] Patent Number: 4,509,482
[45] Date of Patent: Apr. 9, 1985

[54] ELECTRONICALLY CONTROLLED IGNITION SYSTEM

[75] Inventors: Willy Minner, Schwaigern; Alfred Krappel, Ismaning; Johannes Guggenmos, Dirlewang, all of Fed. Rep. of Germany

[73] Assignees: Telefunken Electronic GmbH, Heilbronn; Bayerische Motoren Werke AG, Munich, both of Fed. Rep. of Germany

[21] Appl. No.: 415,704

[22] Filed: Sep. 2, 1982

[30] Foreign Application Priority Data

Sep. 3, 1981 [DE] Fed. Rep. of Germany ....... 3134883

[51] Int. Cl.³ ............................................... F02P 5/04
[52] U.S. Cl. ...................................... 123/418; 123/415
[58] Field of Search ................................ 123/418, 415

[56] References Cited

U.S. PATENT DOCUMENTS

| | | | |
|---|---|---|---|
| 4,125,097 | 11/1978 | Gunderson | 123/418 |
| 4,142,490 | 3/1979 | Hosaka | 123/418 |
| 4,201,163 | 5/1980 | Hattori | 123/418 |
| 4,245,600 | 1/1981 | Katada | 123/418 |

Primary Examiner—Ronald B. Cox
Attorney, Agent, or Firm—Spencer & Frank

[57] ABSTRACT

The invention relates to an electronically controlled ignition system in which a correction signal is obtained from a control signal derived directly from an ignition pulse sensor. The invention consists of producing a saw-tooth signal with a rising flank and a falling flank within one cycle of the square wave control signal, using only one flank of the said control signal. The ratio or relationship between the gradients of the two flanks is a measure of the change in the corrected signal relative to the control signal. The electronically controlled ignition system is particularly suitable for compensating for the ignition advance, caused by an induction sensor, as compared to the mechanical position of the rotor at low engine speeds.

17 Claims, 25 Drawing Figures

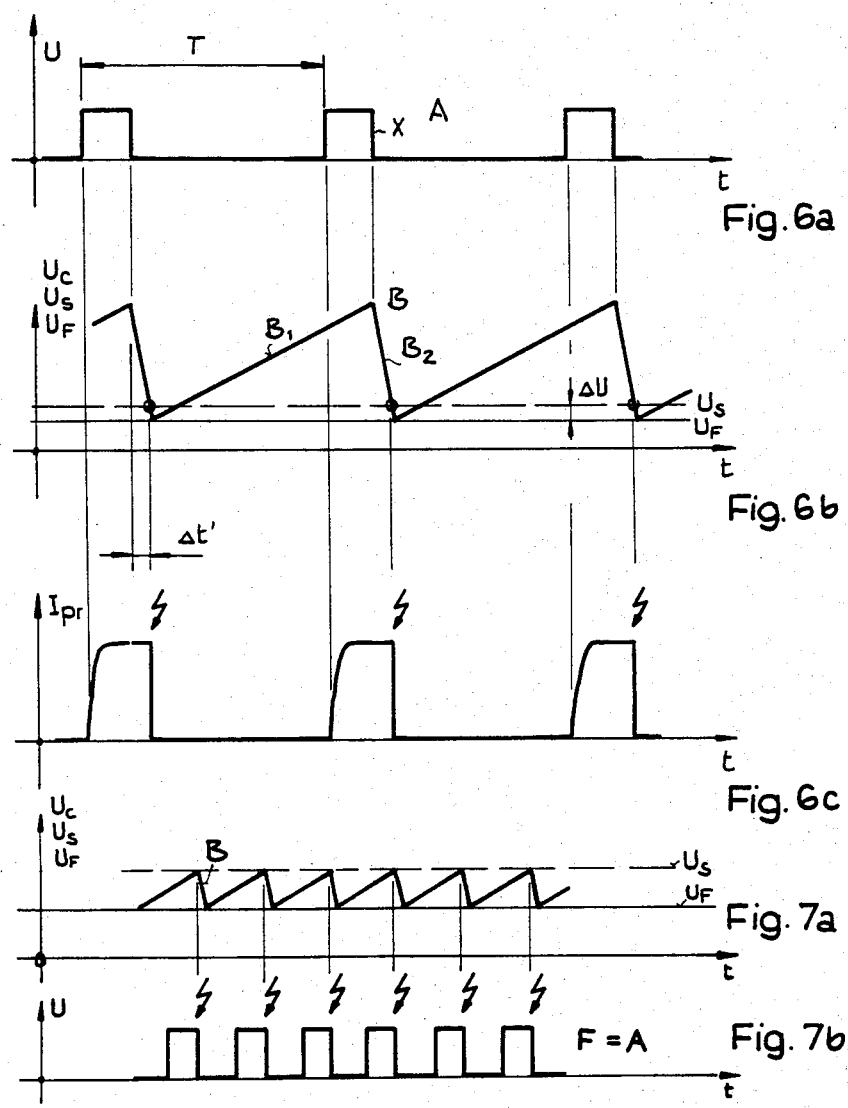

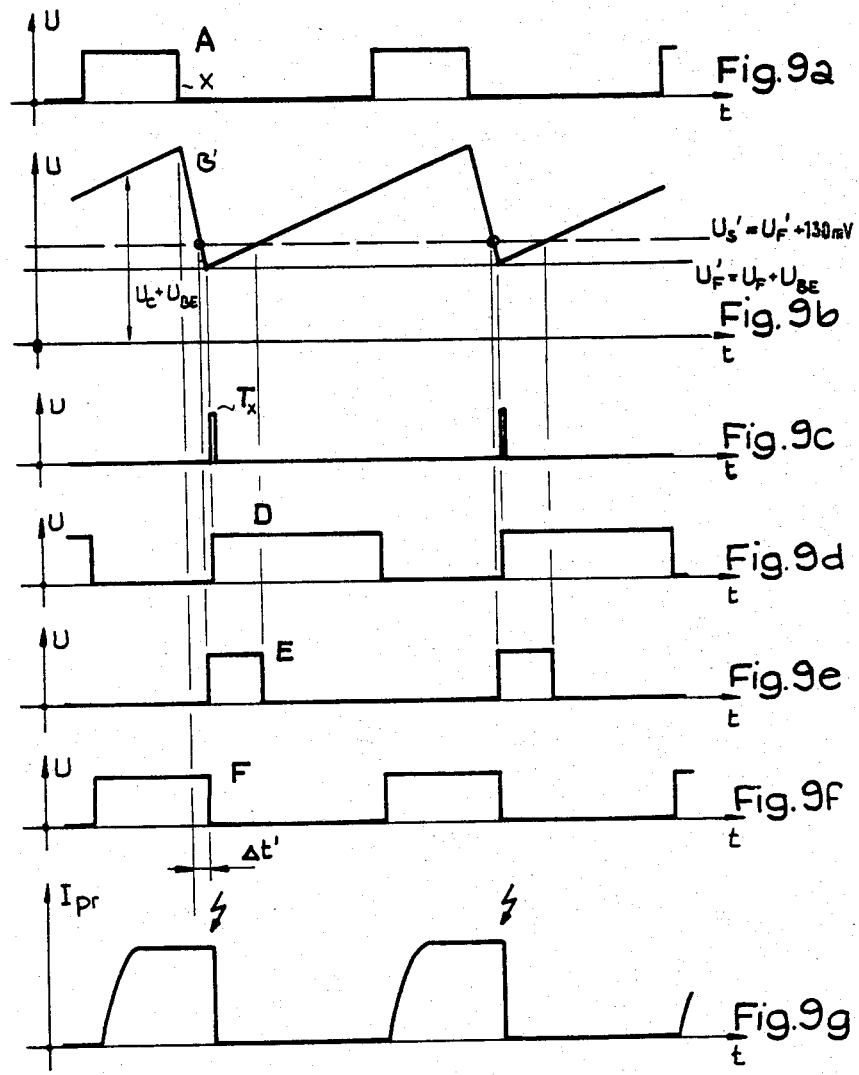

ELECTRONICALLY CONTROLLED IGNITION SYSTEM

BACKGROUND OF THE INVENTION

The invention relates to an electronically controlled ignition system for an internal combustion engine in which a signal correcting ignition timing is derived from a control signal which in turn is derived directly from an ignition pulse sensor. Control signals for the ignition process of the motor, which are derived by an ignition pulse generator which senses the position of the rotor, have to be corrected both as a function of speed and also irrespective of speed for various reasons.

SUMMARY OF THE INVENTION

The object underlying the invention is to provide an electronically controlled ignition system in which a corrected signal is obtained very simply from the control signal derived by the ignition pulse sensor.

This object is achieved in accordance with the invention by an electronically controlled ignition system for an internal combustion engine comprising an ignition pulse sensor, control signal generating means producing a square wave control signal in dependence on said sensor, wherein a saw-tooth signal is produced in each cycle of the square wave control signal, the saw-tooth signal having a slow rising flank and a rapid falling flank, the latter being derived from only one flank of the control signal and the relationship of the gradients of the two flanks of said saw-tooth signal being a measure for the change necessary in the control signal to produce a corrected control signal.

An electronically controlled ignition system of this type has the advantage that it is not necessary to use both flanks of the square wave signal within one period to produce the correction magnitude. On the contrary according to the invention only one flank of the control signal is used to produce this correction magnitude while the second flank of the control signal does not have any effect on the scale of the correction value.

In the ignition system controlled electronically in accordance with the invention, one flank of the square wave control signal triggers preferably the falling flank of the saw toothed shaped signal. This falling flank terminates when a predeterminable value is reached and the rising flank is then triggered, the latter ending when the control flank of the control signal occurs in the following period and is triggered by the falling flank. The one control flank of the control signal preferably is the high/low flank of the control signal. In a preferred embodiment of the invention the corrected signal is lengthened as compared to the control signal by the time determined by the falling flank of the saw-tooth signal. There is also the possibility of lengthening the corrected signal if necessary as compared to the control signal only by part of the time determined by the falling flank of the saw-tooth signal, this part of the time changing with the speed of the rotor. The saw tooth shaped signal is preferably provided by the voltage curve on a capacitor. This capacitor is charged up again by the currents which determine the gradients of the signal flanks until the one flank of the control signal occurs and then is discharged again until a predeterminable reference voltage is reached.

BRIEF DESCRIPTION OF THE DRAWINGS

The invention will now be described with reference to several exemplary embodiments, as illustrated in the accompanying drawing. In these:

FIGS. 6a to 6c and 7a to 7b show yet further voltage and current characteristics;

FIGS. 9a to 9g show voltage and current characteristics applicable to FIG. 8.

DESCRIPTION OF THE PREFERRED EMBODIMENT

Figure 1A:
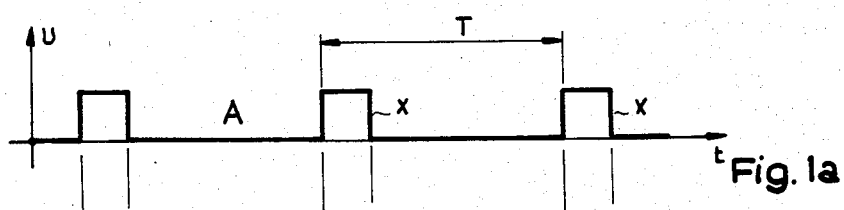
FIGS. 1a to 1d show voltage and current characteristics in a circuit operating according to the invention.

A control signal A according to FIG. 1a is derived from the output signal of an ignition pulse sensor, for example an induction sensor. This control signal has the period T. The falling high/low flank X is used as the control flank for producing a saw-tooth signal according to FIG. 1b within one period T.

Figure 1B:
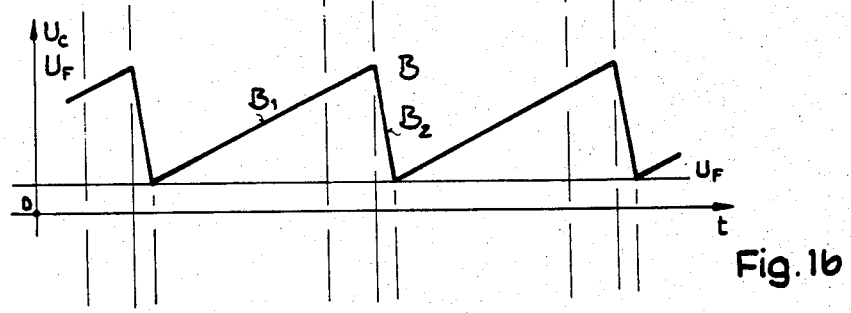
Figure 2:
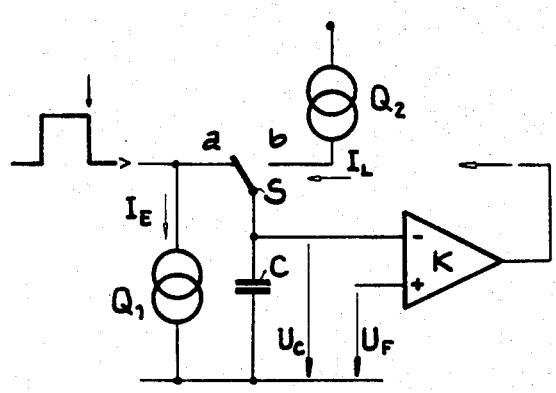
FIG. 2 shows a schematic circuit diagram to operate according to the invention.

The discharge current $I_E$ of a current source $Q_1$ is released by the control flank X in a general circuit according to FIG. 2 so that the previously charged capacitor C is discharged according to the falling flank $B_2$ in FIG. 1b by means of the switch S in the position "a". Overall curve of the voltage $U_C$ at the capacitor is shown as function curve B in FIG. 1b. The capacitor voltage $U_C$ is compared by a comparator K having the fixed voltage $U_F$. If $U_C$ falls below $U_F$ then the output of the comparator K switches the switch S into the position "b" and as a result the capacitor C is charged with the charge current $I_L$ of the constant current source $Q_2$ so that the voltage at the capacitor C rises according to the rising flank $B_1$ in FIG. 1b. The gradients of the flanks $B_1$ and $B_2$ are determined by the magnitude of charge and discharge current from the current sources $Q_1$ amd $Q_2$.

Figure 1C:
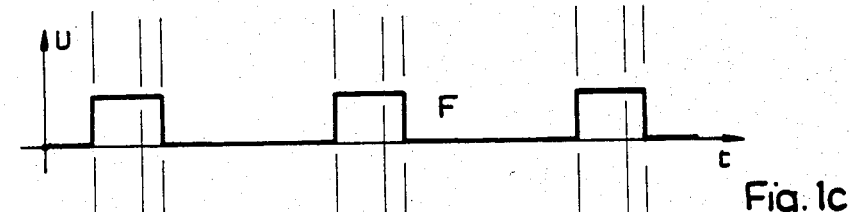
Figure 1D:
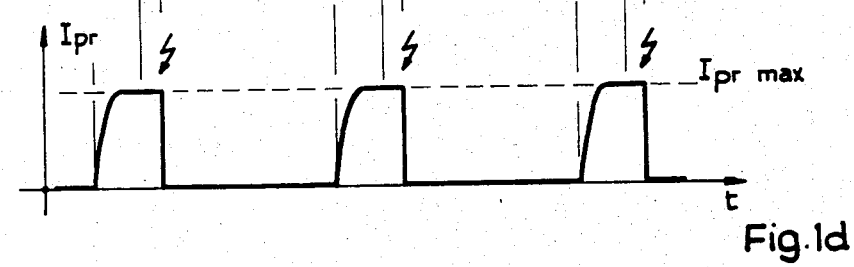

The control pulse according to FIG. 1a is lengthened by the correction magnitude, i.e. the time $\Delta t$ which corresponds to the duration of the discharge process of the capacitor and therefore the falling flank $B_2$. The corrected signal F which is obtained in this way is shown in FIG. 1c. This corrected signal may be used for example instead of the control signal A to control the current in the primary side of the ignition coil. According to FIG. 1d the primary current $I_{pr}$ begins to flow with the low/high flank of the correction signal F and is abruptly interrupted when the high/low flank of the correction signal F appears so that there is ignition, as is indicated in FIG. 1d by ignition arrows. The ignition time is then delayed by the time $\Delta t$ as compared to the ignition time which would have occurred if the control signal A had been used. The ignition point of an engine ignition unit may be set according to requirements using this control principle.

The electronically controlled ignition system is particularly suitable for producing a correction signal which is used to compensate or overcompensate for the advance of the ignition time caused by an induction sensor as compared to the mechanical position of the rotor at low speeds.

Figure 3:
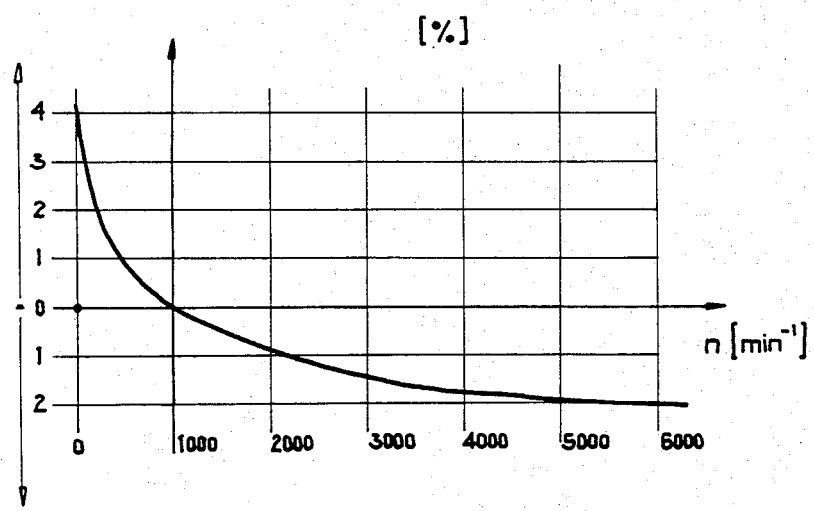
FIG. 3 is a graph of ignition advance and retard against engine revolutions.

As is apparent from FIG. 3. the zero axis crossing in the induction sensor of the control flank X of the control signal A, which triggers ignition, is not in agreement with the mechanical position of the rotor according to FIG. 1a.

If the voltage zero axis crossing at for example 1000 R/min (idling speed) is adjusted to the mechanical position of the rotor then FIG. 3 shows that in the start phase and at 150 R/min the zero axis crossing of the control signal advances by 4-6% in relation to the period and at maximum speed is retarded by approximately 2%. Since ignition takes place with the voltage zero axis crossing of the control signal the induction sensor acts oppositely to the requirements of an engine for good running especially in the starting phase.

Figure 4:
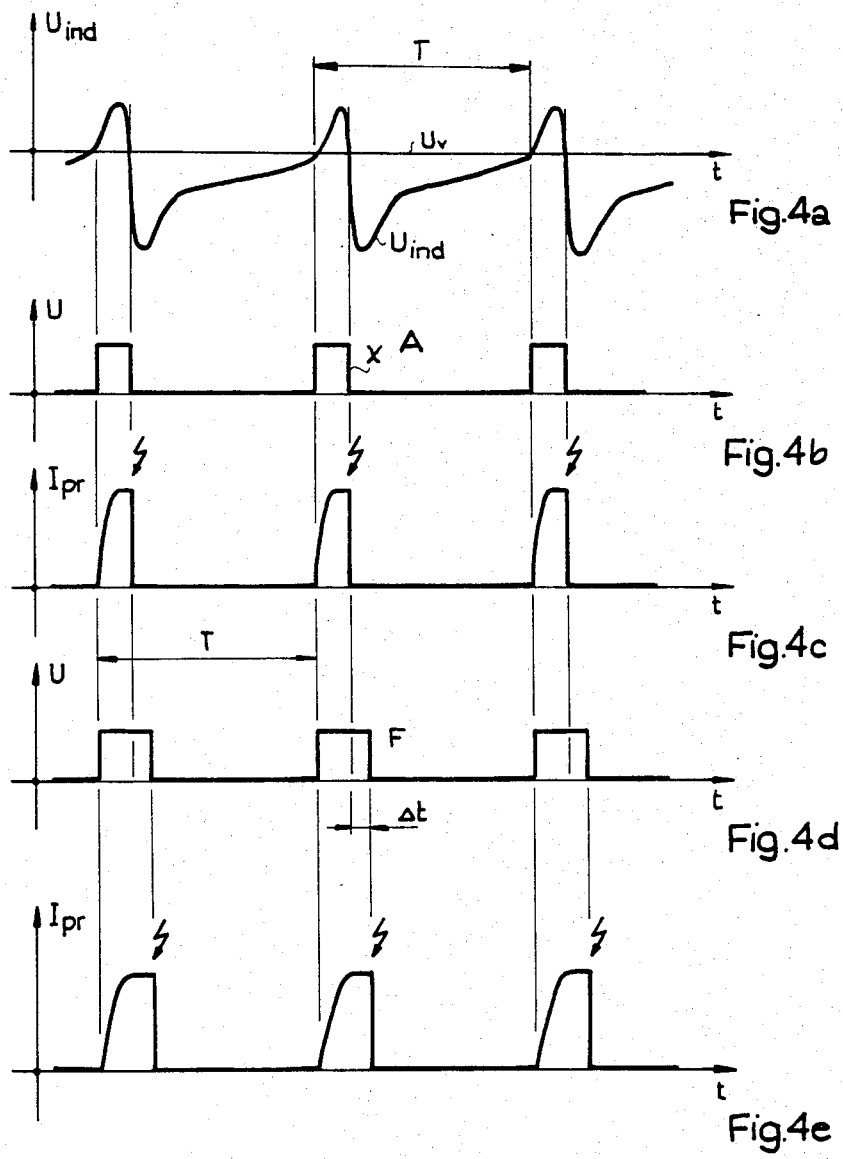
FIGS. 4a to 4e shows further voltage and current characteristics.

With the aid of the electronically controlled ignition in accordance with the invention the advance caused by the induction sensor is eliminated in the starting phase. In FIG. 4a the voltage $U_{IND}$ is plotted and is the voltage delivered by an induction sensor. T is the period and $U_V$ is the comparison voltage of a comparator. FIG. 4b shows the voltage curve A at the output of the comparator.

If $U_{IND} \geq U_V$ then A is "High", otherwise it is "Low". With the output signal A of the comparator the current $I_{pr}$ according to FIG. 4c is switched on when "High" on the primary side of the ignition coil and is switched off abruptly with the "high/low" flank of the signal A so that ignition takes place.

During the start phase the disconnection flank X is to be lengthened for the primary coil current $I_{pr}$ in accordance with the invention and at the same time triggering of ignition is lengthened by the time period $\Delta t$ so as to compensate or overcompensate for the advance of the ignition time which is caused by the induction sensor.

In FIG. 4d the corrected signal F is shown and its high phases are extended by the desired period of time $\Delta t$ so that the high/low flank triggering ignition is delayed as compared to the control flank X of the control signal A by the time $\Delta t$. As a result the primary current $I_{pr}$ is disconnected in a manner which triggers ignition according to FIG. 4e and this takes place also with a delay time $\Delta t$.

When correcting the premature ignition during the start phase it is desirable to have a curve as will be described in greater detail for FIG. 5.

Figure 5:
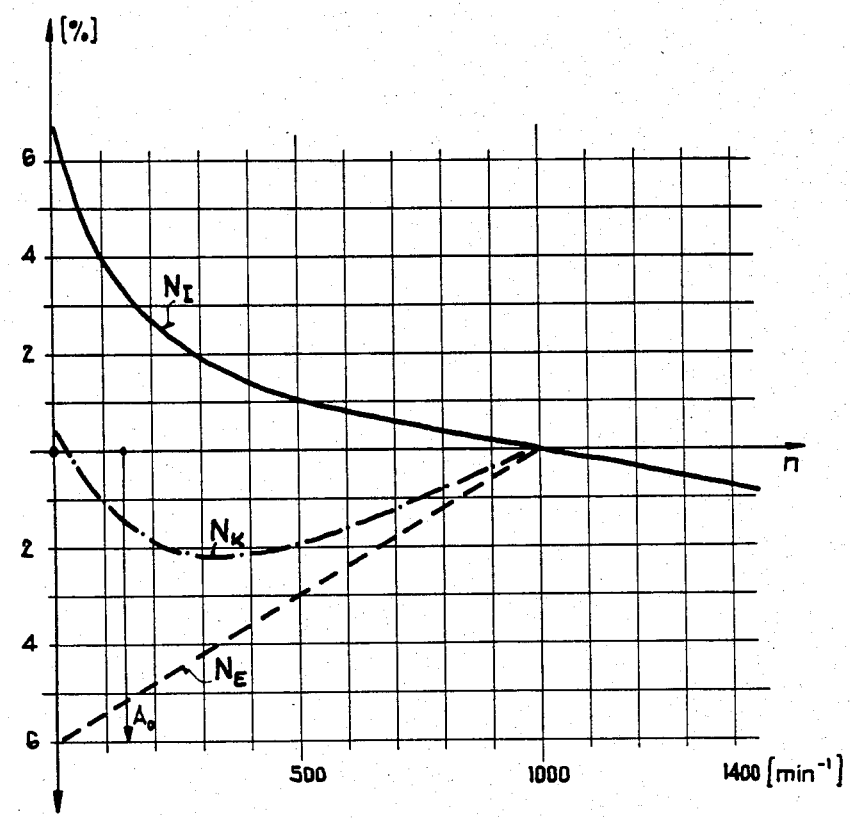
FIG. 5 shows a revised graph as in FIG. 3.

In FIG. 5 the start phase of the motor is shown on a scale which is enlarged as compared to FIG. 3. The curve path $N_I$ show the advance of the zero axis crossing of the control signal A as a function of the speed n which is between 0 and 1000 revolutions per minute. The electronic compensation which is envisaged is shown by the function path of the straight line $N_E$. This straight line has the following function:

$$N_E = A_o - x \cdot n$$

The value $A_o$ is selected in a preferred embodiment at $A_o = 6\%$. If the straight line $N_E$ should provide a shift in ignition of 0% at 1000 R/min then X has the value:

$$X = \frac{0.006\%}{u/min}$$

where n is the speed of the motor per minute.

By adding the function paths of $N_I$ and $N_E$ the compensated function path $N_K$ according to FIG. 5 is obtained. This function shows that in the start phase there is desired retard of a maximum of 2% which falls to zero when 1000 R/min is reached. The desired electronic compensation $N_E$ is obtained if the following is true for the correction signal F in FIG. 4d:

$$N_E = \frac{\Delta t}{T} \, (\%)$$

If with a signal F according to FIG. 1c the electronic lengthening of the control signal A according to FIG. 1a has the value:

$$\frac{\Delta t}{T} = 6\%$$

then the ratio between the charge current $I_L$ and the discharge current $I_E$ in a circuit arrangement according to FIG. 2 should be made to have the value:

$$\frac{I_L}{I_E} = 0.06$$

If according to FIG. 1d the primary coil current $I_{pr}$ is switched on with the low/high flank of the control signal A, and switched off when the saw-tooth shaped signal B according to FIG. 1b falls below the value of the fixed voltage $U_F$, then the ignition time is shifted by means of the correction signal F, by 6% as compared to the time when ignition would have occurred with ignition with the control signal A.

Given this compensation technique which is apparent in FIGS. 1a to 1d the percentage shift $\Delta t / T$ of the correction signal F in relation to the control signal A is constant from a very low speed for example 50 R/Min to the very high speed and in the example shown would amount of 6%. However FIG. 5 requires the percentage value of compensation $N_E$ to fall with increasing speed and to reach the value 0 at approximately 1000 R/min.

This requirement is met in accordance with the invention by comparing the falling flank of the sawtooth signal with a fixed voltage which is larger than the reference voltage. The correction signal is lengthened as compared to the control signal by a period of time $\Delta t$ which is given by the duration of the falling flank of the saw-tooth shaped signal until the newly added fixed voltage is reached.

The potential spacing between the newly introduced fixed voltage $U_S$ and the reference voltage $U_F$ has to be selected so that when a certain threshold speed of the rotor is reached—for example 1000 R/min—the saw tooth shaped signal no longer reaches the fixed voltage value $U_S$ at its maximum so that from this threshold speed onwards the control signal A is no longer extended and/or the control flank X is no longer delayed. Below this threshold speed on the other hand the correction signal or the delay in the flank which initiates ignition increases as the speed falls.

In an exemplary embodiment the gradient of the increase in the voltage at the capacitor—i.e. the gradient of the flank $B_1$ according to FIG. 1b—is 4.3 V/sec with a reference voltage of $U_F = 0.4$ V. When the speed is 50 R/min the compensation should be 6%. At this speed the voltage at the capacitor reaches its maximum value, for example $U_{Cmax}=3$ V. In this embodiment the maximum value of the saw-tooth shaped signal B coincides with the fixed voltage value $U_S$ at 1000 R/min if the potential spacing $\Delta U$ is approximately 130 mV between the fixed voltage $U_S$ and the reference voltage $U_F$.

The ratios or conditions when inserting the fixed voltage $U_S$ are shown in FIGS. 6a to 6c and 7a to 7b. With a very low speed the intersection point between the falling flank $B_2$ of the saw-tooth shape B and the fixed voltage $U_S$ in accordance with FIG. 6b almost coincides with the intersection point of the falling flank $B_2$ and the reference voltage $U_F$. This is because the potential difference U is small in relation to the maximum voltage of the saw-tooth shaped signal B. These ratios apply at speed of 50 R/min for example. The ignition time is consequently delayed with the aid of the saw-tooth shaped signal B according to FIG. 6c at low speeds and with the said ratios by the following amount:

$$\frac{\Delta t}{T} = 6\%$$

The percentage delay in the ignition time decreases as the speed increases since the maximum value of the signal B falls continuously as the speed rises and therefore there is a larger part of falling flank $B_2$ of the saw-tooth shaped signal B which falls into the potential range between $U_S$ and $U_F$.

Given the ratios which are by way of example the delay in the ignition time at 125 R/min is approximately 5.2% at 250 R/min it is approximately 4.5%, at 500 R/min it is approximately 3%, and at 1000 R/min it is approximately 0%.

FIGS. 7a and 7b show the ratios at a speed of approximately 1000 revolutions per minute. According to FIG. 7a the saw-tooth shaped signal B only continues to oscillate between the fixed voltage $U_S$ under reference voltage $U_F$ because of the dimensions selected at 1000 R/min. The interval of time $\Delta t$ between the maximum value of the saw-tooth shaped signal B and the fixed voltage $U_S$ becomes zero at a speed of 1000 R/min. According to FIG. 7b the correction signal F is identical to the control signal A which is derived from the induction sensor. Compensation of the ignition shift takes place only in the speed range between 0 and 1000 R/min.

Current sources which are used to charge and discharge the capacitor in the manner described in order to produce the saw-tooth shaped signal B are present in the embodiment of the electronically controlled ignition system in accordance with the invention which is shown in circuit outline. Furthermore, a comparator $K_1$ is present and is used to compare the capacitor voltage to the reference voltage $U_F$. A second comparator $K_2$ is used to compare the capacitor voltage to the fixed voltage $U_SV$.

Furthermore, the circuit comprises a bistable trigger circuit FF, which is switched by the output of the first comparator into one stable condition and by the low-/high flank of the control signal A into the other stable condition.

The output signal F is obtained by forming the circuit with a NOR gate G, the output signal of the trigger stage FF being supplied to one input and the output signal of the second comparator $K_2$ being supplied to the other input.

Figure 8:
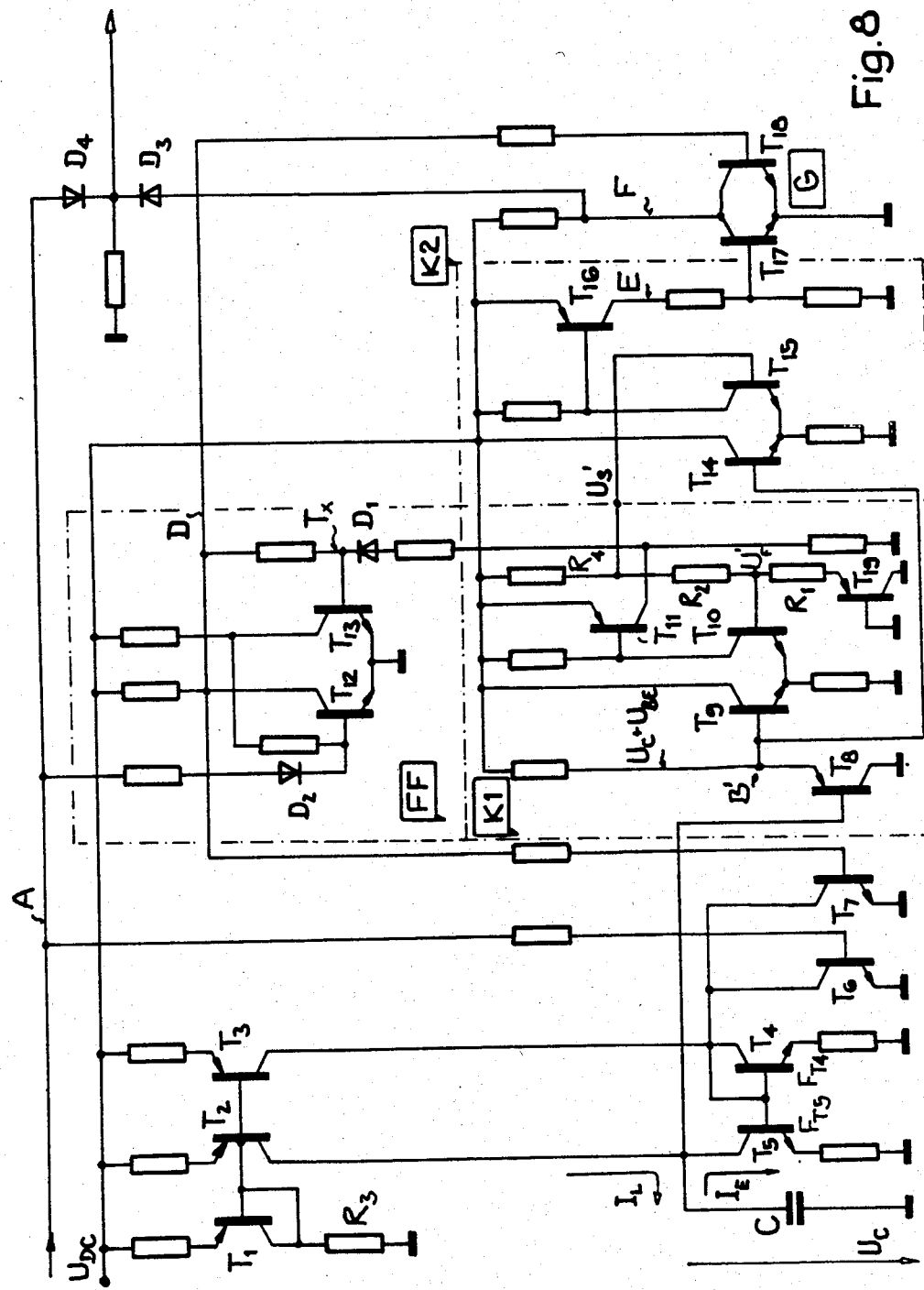
FIG. 8 shows a practical circuit diagram according to the invention.

This type of circuit is shown in FIG. 8. The capacitor C is charged by the charge current $I_L$ and discharged by the discharge current $I_E$. The charge current $I_L$ is adjusted by the current mirror comprising transistors $T_1$ and $T_2$ in conjunction with the resistor $R_3$ in the collector branch of the transistor $T_1$. The discharge current is set by the current mirror comprising transistors $T_3$, $T_4$ and $T_5$, the following applying to the ratio between the active transistor surfaces or areas of the transistors $T_4$ and $T_5$:

$$\frac{F_{T5}}{F_{T4}} = \frac{I_E}{I_L} + 1$$

In addition the charge current $I_L$ flows continuously whereas the discharge current $I_E$ is only released when the transistors $T_6$ and $T_7$, which are connected in parallel with the base emitter path of the transistor $T_5$, are blocked.

The voltage $U_C$ across capacitor C is passed to one input of the comparator $K_1$ via the transistor $T_8$. The comparator $K_1$ comprises the differential amplifier having transistors $T_9$ and $T_{10}$ and the final transistor $T_{11}$. The capacitor voltage B' which is increased by the base emitter voltage of the transistor 8 is applied to the base electrode of the transistor $T_9$. The reference voltage $U'_F$ is applied to the second input of the comparator $K_1$, i.e. to the base electrode of the transistor $T_{10}$. This reference voltage is raised in relation to the actual reference voltage $U_F$ set by the voltage divider $R_1$, $R_2$, $R_4$ by the base emitter voltage of the transistor $T_{19}$ for compensating for the corresponding base emitter voltage of the transistor $T_8$.

The output signal of the comparator $K_1$ is passed as trigger signal $T_X$ to the input of the bistable trigger stage FF.

In FIG. 9a the input control signal A is shown and is decoupled according to FIG. 8 via the diode $D_4$ from the output of the circuit, and is connected to the base electrode of the transistor $T_6$ and to the second input of the bistable trigger stage FF.

In FIG. 9b the saw-tooth shaped signal B' at the input of the comparator $K_1$ is shown. Furthermore, the reference voltage $U'_F$ and the fixed voltage $U'_S$ are plotted in FIG. 9b. The comparator $K_1$ only emits an output signal $T_x$ according to FIG. 9c when the saw-tooth shaped signal B' reaches the reference voltage $U'_F$. The output of the comparator $K_1$ at the collector of the transistor $T_{11}$ therefore has a low level when $U_C+U_{BE}>U_{F'}$. When $U_C+U_{BE}\leq U_{F'}$ the output signal $T_X$ has a high level.

As the pulse $T_X$ of FIG. 9c occurs there is high potential at the output of the bistable trigger stage FF according to FIG. 9d. This potential is maintained until the low/high flank of the input control signal A resets the output of the bistable trigger stage FF again to low. Consequently the signal D shown in FIG. 9d is applied to the output of the bistable trigger stage FF. This signal D is passed to the base electrode of the transistor $T_7$ so that when D is at high potential the transistor $T_7$ is conductive and the base of the transistor $T_5$ is at low potential. As a result the discharge current $I_E$ cannot flow during the high phase of the signal D. Even during the high phase the input control signal A and discharge current $I_E$ of the capacitor is blocked in the same way by the transistor $T_6$. During the high phases of the signals A and D the capacitor C is charged up with the aid of the charge current $I_L$. When the control flank X of the input control signal A occurs on the other hand both transistors $T_6$ and $T_7$ are blocked so that the discharge current $I_E$ of the capacitor C is able to flow until the low/high flank of the signal D occurs, so that the function path B of the saw-tooth shaped signal, shown in FIG. 9b, is implemented at the capacitor C. In summary:

| A or D = "High" | C is charged up |
|---|---|
| A and D = "Low" | C is discharged |

FIG. 8 includes a second comparator $K_2$ comprising transistors $T_{14}$ to $T_{16}$. The fixed voltage $U_S'$ is passed to one input electrode of this second comparator which corresponds to the base electrode of the transistor $T_{15}$, and $U_S' = U_F' + 130$ mV when the ratios between the dimensions which have just been described are taken as the basis. The saw-tooth shaped signal B' which corresponds to the capacaitor voltage is in turn applied to the second input electrode of the comparator $K_2$ which corresponds to the base electrode of the transistor $T_{14}$.

The signal E shown in FIG. 9e is derived at the output of the comparator $K_2$ which corresponds to the collector of the transistor $T_{16}$. The transistor $T_{16}$ is made conductive when the transistor $T_{15}$ of the comparator $K_2$ is also conductive. This is the case if $U_S' \geq U_C + U_{BE}$. It is only during these times that the signal E according to FIG. 9e has high potential.

The signal E at the collector electrode of the transistor $T_{16}$ and the output signal D of the bistable trigger stage FF are passed to a gate G in order to produce the correction signal F. This gate G is a NOR gate comprising transistors $T_{17}$ and $T_{18}$ according to the circuit according to FIG. 8. The two transistors are connected at their collector electrodes and emitter electrodes. The signal E is supplied to input of the NOR gate G which is formed by the base electrode of the transistor $T_{17}$. The output signal D of the bistable trigger stage FF is supplied to the other input of the NOR gate G which is formed by the base electrode of the transistor $T_{18}$. The output signal F is tapped at the collector electrodes of the two transistors $T_{17}$ and $T_{18}$. F is only a high potential when both input signals of the NOR gate are low. The output signal F therefore has a square configuration according to FIG. 9f in which the low/high flank corresponds to the low/high flank of the input control signal A and the high/low flank is defined by the low/high flank of the signal E. The output signal F is extended by the time 't' as compared to the control signal A and 't' corresponds to the time required by the falling flank of the saw-tooth shaped signal B' until the voltage $U_S'$ is reached. The output signal F is passed via a diode $D_3$ to the output of the circuit shown in FIG. 8. The path of the current flow in the primary coil is shown in FIG. 9g when a correction signal F according to FIG. 9f is present.

The input control signal A which determines the primary current in the ignition coil on its own at relatively high speeds reaches the circuit output by the diode $D_4$. At these higher speeds, for example at speeds of over 1000 R/min the output signal F is always low since the transistor $T_{16}$ is made continuously conductive in FIG. 8 from this speed onwards. The circuit portion which serves to carry out compensation no longer affects the current flow in the primary coil from a fixed threshold speed onwards.

It will be understood that the above description of the present invention is susceptibel to various modifications, changes and adaptations.

What is claimed is:

1. An electronically controlled ignition system for an internal combustion engine comprising an ignition pulse sensor, control signal generating means producing a square wave control signal in dependence on said sensor, and means connected to receive the control signal for producing a saw-tooth signal in each cycle of the square wave control signal, the saw-tooth signal having a slow rising flank and a rapid falling flank and being derived from only one flank of the control signal and the relationship of the gradients of the two flanks of said saw-tooth signal being a measure for the change necessary in the control signal to produce a corrected control signal.

2. An electronically controlled ignition system according to claim 1 wherein the one flank of the control signal triggers the falling flank of the saw-tooth signal, and said falling flank terminates when a predeterminable value is reached and triggers the rising flank.

3. An electronically controlled ignition system according to claim 1 wherein the one flank is the high/low flank of the square wave control signal.

4. An electronically controlled ignition system according to claim 1 wherein the corrected control signal is lengthened as compared to the control signal by the time determined by the falling flank of the saw-tooth signal.

5. An electronically controlled ignition system according to claim 1 wherein the corrected signal is lengthened as compared to the control signal only by a portion of the time determined by the falling flank of the saw-tooth signal, which changes with the speed of the rotor.

6. An electronically controlled ignition system according to claim 1 wherein the saw-tooth signal is given by the voltage characteristic of a capacitor which is charged by the currents determining the gradients of said rising and falling flanks, until said one flank of the control signal occurs and which then is discharged until a predeterminable reference voltage is reached.

7. An electronically controlled ignition system according to claim 6 wherein the falling flank of the saw-tooth signal is compared to a fixed voltage which is larger than the reference voltage and the corrected signal is lengthened as compared to the control signal, or the appearance of a flank of the corrected signal is delayed as compared to the corresponding said one flank of the control signal, by a period of time determined by the time from the start of the falling flank until the fixed voltage is reached.

8. An electronically controlled ignition system according to claim 7 characterised in that the high/low flank of the corrected signal determines the ignition time.

9. An electronically controlled ignition system according to claim 8 wherein the potential difference between the fixed voltage and the reference voltage is selected so that when a certain threshold speed of the rotor is reached the saw-tooth signal no longer reaches the fixed voltage value at its maximum, so that from this threshold speed onwards the control signal is no longer lengthened and said one flank is no longer delayed, while below this threshold speed the degree of lengthening of the corrected signal and the delay of the flank which initiates the ignition increases as the speed falls.

10. An electronically controlled system according to claim 7 wherein the gradient of the flanks of the saw-tooth signal and the fixed voltage and the reference voltage are selected such that with a very low rotor speed the corrected signal is lengthened by a fixed maximum value (Ao) as compared to the control signal, and the flank of the corrected signal which causes ignition is delayed as compared to said one flank, and that this value decreases linearly until the "Zero" value of the threshold speed is reached.

11. An electronically controlled ignition system according to claim 10 characterised in that the amount by which the corrected signal is lengthened as compared to the control signal is approximately 6% of the period at approximately 50 R/min of the engine; and that the threshold speed after which the control signal is no longer corrected is approximately 1000 R/min.

12. An electronically controlled ignition system according to claim 7, wherein current sources are provided by means of which the capacitor is charged and discharged in order to produce the saw-tooth signal, a first comparator being provided, the capacitor voltage being compared to the reference voltage in this first comparator, and a second comparator being provided which is used to compare with the capacitor voltage with the fixed voltage.

13. An electronically controlled ignition signal according to claim 12 wherein a bistable trigger stage is provided which is changed by the output of the first comparator to one stable condition, and by the low/-high flank of the control signal into the other stable condition.

14. An electronically controlled ignition system according to claim 13, wherein a NOR Gate is provided, its one input receiving the output signal of the trigger stage and its other input receiving the output signal of the second comparator, the corrected signal being tapped at the output of the said second comparator.

15. An electronically controlled ignition system according to claim 12, wherein the charging current of the capacitor flows continuously and the discharge current of the capacitor only flows for the time between which the one flank of the control signal occurs and the time when the capacitor charge reaches the reference voltage.

16. An electronically controlled ignition system according to claim 15 wherein the current source which delivers the discharge current is blocked both by the high potential of the control signal and by the high potential of the output signal of the bistable trigger stage.

17. An electronically controlled ignition system according to claim 15 wherein the current sources delivering the charge and discharge current of the capacitor are linked similarly to a current image amplifier the ratio between the active areas or surfaces of the transistors which form the current image amplifier determining the ratio between the charge and discharge current.

* * * * *